US009961535B2

(12) United States Patent
Bucchieri

(10) Patent No.: US 9,961,535 B2
(45) Date of Patent: May 1, 2018

(54) METHOD AND SYSTEM OF PROVIDING INSTANT LOCATION SERVICE

(75) Inventor: Vittorio Bucchieri, Wakefield, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1356 days.

(21) Appl. No.: 11/669,581

(22) Filed: Jan. 31, 2007

(65) Prior Publication Data

US 2008/0182589 A1 Jul. 31, 2008

(51) Int. Cl.
| | |
|---|---|
| *H04W 24/00* | (2009.01) |
| *H04W 8/14* | (2009.01) |
| *H04W 4/02* | (2018.01) |
| *H04L 29/08* | (2006.01) |

(52) U.S. Cl.
CPC .............. *H04W 8/14* (2013.01); *H04L 67/24* (2013.01); *H04W 4/02* (2013.01); *H04L 67/18* (2013.01)

(58) Field of Classification Search
CPC .......... H04W 8/14; H04W 4/02; H04L 67/18; H04L 67/24
USPC ...................................................... 455/456.3
See application file for complete search history.

(56) References Cited

U.S. PATENT DOCUMENTS

| 7,171,221 | B1* | 1/2007 | Amin et al. ................. 455/462 |
| 7,720,601 | B2* | 5/2010 | Zhao ...................... G01S 19/27 |
| | | | 342/357.42 |
| 2003/0013461 | A1* | 1/2003 | Mizune et al. ............. 455/456 |
| 2004/0193601 | A1* | 9/2004 | Hu et al. ............................ 707/9 |
| 2004/0203902 | A1* | 10/2004 | Wilson et al. ............ 455/456.1 |
| 2005/0060377 | A1* | 3/2005 | Lo et al. ....................... 709/206 |
| 2005/0135305 | A1* | 6/2005 | Wentink ....................... 370/329 |
| 2006/0036688 | A1* | 2/2006 | McMahan et al. .......... 709/206 |
| 2006/0223518 | A1* | 10/2006 | Haney ........................... 455/420 |
| 2006/0227047 | A1* | 10/2006 | Rosenberg .............. 342/357.13 |
| 2007/0021198 | A1* | 1/2007 | Muir et al. ...................... 463/29 |
| 2007/0275706 | A1* | 11/2007 | Furuichi ................... 455/414.2 |
| 2008/0132243 | A1* | 6/2008 | Spalink ............... G09B 29/106 |
| | | | 455/456.1 |
| 2009/0037103 | A1* | 2/2009 | Herbst et al. ................ 701/211 |

* cited by examiner

*Primary Examiner* — Wayne H Cai

(57) ABSTRACT

An approach is disclosed for providing an instant location service. At a wireless device of a first user, mapping information of a second user is received over a wireless network. The mapping information specifies position of the second user within a prescribed proximity of the wireless device. The first user is notified of the location of the second user based on the received mapping information. A communication session is selectively initiated by the wireless device, over the wireless network to the second user.

28 Claims, 8 Drawing Sheets

METHOD AND SYSTEM OF PROVIDING INSTANT LOCATION SERVICE

BACKGROUND INFORMATION

Wireless communication technologies afford users with the convenience of mobility and continually expanding set of capabilities. This convenience has spawned significant adoption by an ever growing number of subscribers as an accepted mode of communication for business and personal uses in terms of communicating using voice and data services. As wireless communication devices become more sophisticated, their features have expanded from merely placing and receiving calls to other enhanced services from music downloads to navigational systems. To support navigational services, cellular phones are equipped with Global Positioning System (GPS) technology to broadcast their locations. Given the competitive landscape of the telecommunication industry, service providers are continually challenged to develop new products and services. However, few applications have been developed to exploit such information about the users' locations.

Therefore, there is a need for an approach that provides enhanced location services for wireless applications.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus, method, and software for providing an instant location service are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various embodiments are described with respect to Global Positioning System (GPS) technology, it is contemplated that these embodiments have applicability to other equivalent navigational and location determination technologies.

Figure 1:
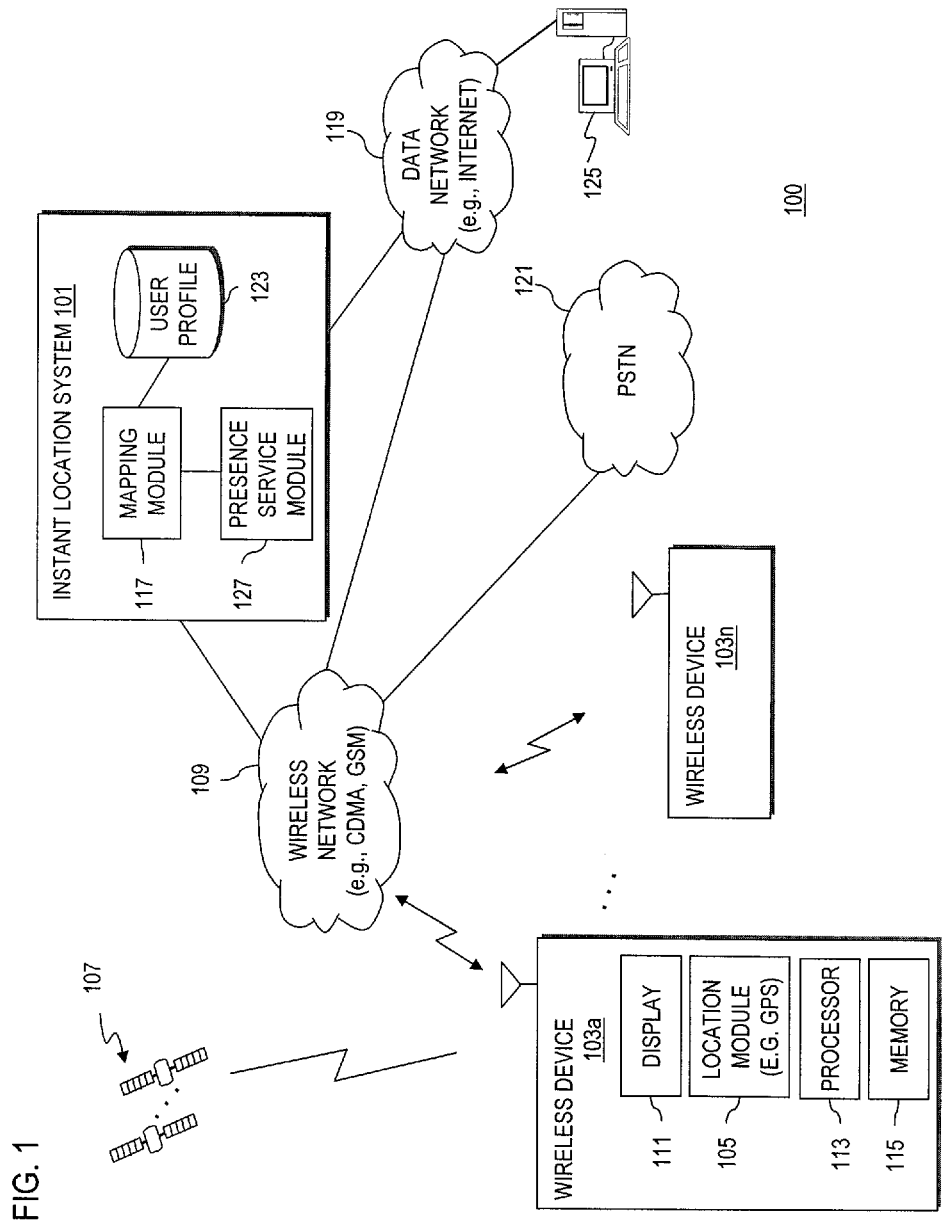
FIG. 1 is a diagram of a communication system capable of providing instant location service, according with an exemplary embodiment.

FIG. 1 is a diagram of a communication system capable of providing instant location service in accordance with an exemplary embodiment. The communication system 100 includes an instant location system 101 for detecting the presence and physical location of users (or subscribers) sing, in an exemplary embodiment, wireless devices 103a-103n. The location of a wireless device (e.g., device 103a) can be detected without the device 103a having to initiate a phone call. A user, via the wireless device 103a, can view the user's personal location on map. In addition, the instant location system 101 provides a service that can show the location of other subscribers on the same map and within a pre-defined proximity. Accordingly, the user is able to contact by, for instance, calling or chatting with one or more of these other users.

In an exemplary embodiment, a location module 105 within the wireless device 103a can obtain location information using Global Positioning System (GPS) technology, and thus, behaves as a GPS receiver. Each of the wireless devices 103a-103n employs a location module 105 that communicates with a constellation of satellites 107. These satellites 107 transmit very low power interference and jamming resistant signals received by the GPS receivers 105. At any point on Earth, the GPS receiver 105 can receive signals from multiple satellites (e.g., 6 to 11). Specifically, the GPS receiver 105 may determine three-dimensional geolocation from signals obtained from at least four satellites. Measurements from satellite tracking and monitoring stations located around the world are incorporated into orbital models for each satellite to compute precise orbital or clock data. GPS signals are transmitted over two spread spectrum microwave carrier signals that are shared by GPS satellites 107. The device 103a needs to identify the signals from at least four satellites 107, decode the ephemeris and clock data, determine the pseudo range for each satellite 107, and compute the position of the receiving antenna.

With GPS technology, the wireless devices 103a-103n can determine their location with great accuracy and convenience. Also, the system 100 can employ Assisted GPS (A-GPS) to mitigate the lost of GPS signals from obstructions between the GPS receiver 105 and the satellites 107. When operating in A-GPS mode, the system 100 can provide for better in building or obstructed view geolocation. Assistance data can be transmitted to the devices 103 from the wireless network 109, in an exemplary embodiment, can include ephemeris data differential GPS correct data, timing data and/or other aiding data. Using the aiding (or assistance) data, the location module 105 performs geolocation calculations; for example, the devices 103a-103n can generate real-time speed and route adherence alerts. Additionally, transmission of geolocation data need not be frequent. Transmission of geolocation data is more compact because it is true location rather than pseudo range data. Also, the wireless devices 103a-103n can more intelligently request assistance data because the devices 103a-103n themselves can determine when the ephemeris data is no longer valid.

Each of the wireless devices 103a-103n utilizes a display 111 to present a graphic of a map and directions, as to permit viewing of the current location of other subscribers within the map of a pre-defined size (e.g., a street block wide, a mile wide, etc.). The wireless devices 103a-103n also includes a processor 113 and a memory 115 configured to store and execute instructions for supporting the instant location service, as well as other communication functions.

The instant location system 101 includes a mapping module 117 that receives location information from the wireless devices 103a-103n, and determines whether other users are within the proximity of a particular subscriber. That is, the location service allows subscribers using the wireless devices 103a-103n (and specified within each others' contact lists) to detect each other's presence and physical location, and to establish communication over the wireless network 109, a data network 121 and/or a telephony network 119 (such as a Public Switched Telephone Network (PSTN)).

Communication among the wireless devices 103, for example, can be audio communication (such as a telephony session) or text messaging (e.g., Instant Messaging (IM) and Short Message Service (SMS)). Instant messaging is a form of real-time communication between two or more users based on typed text, wherein the text is conveyed via computers connected over the data network 119, such as the Internet. As the name suggests, SMS service enables the transmission of short text messages among wireless devices 103 in a store and forward manner. These short text messages in general can be delivered at any point in time using out-of-band packet, low-bandwidth delivery mechanisms.

The contact lists can be maintained within a user profile database 123. The user profile can also include information about and identifiers of the users for dissemination to the wireless devices 103a-103n. The user profile can be updated by a user over the data network 109 through a computing device 125, which can be a personal computer (PC), laptop, palm computer, workstation, web appliance, etc. Further, the instant location system 101 includes, or utilizes, a presence service module 127 to capture presence information or availability of the users of the devices 103a-103n. An exemplary model for presence determination is detailed in Internet Engineering Task Force (IETF) Request for Comment (RFC) 2778, which is incorporated herein by reference in its entirety.

As mentioned, the instant location system 101 permits subscribers to detect each other's presence and physical location and initiate communication, as illustrated in FIGS. 2-6.

Figure 2:
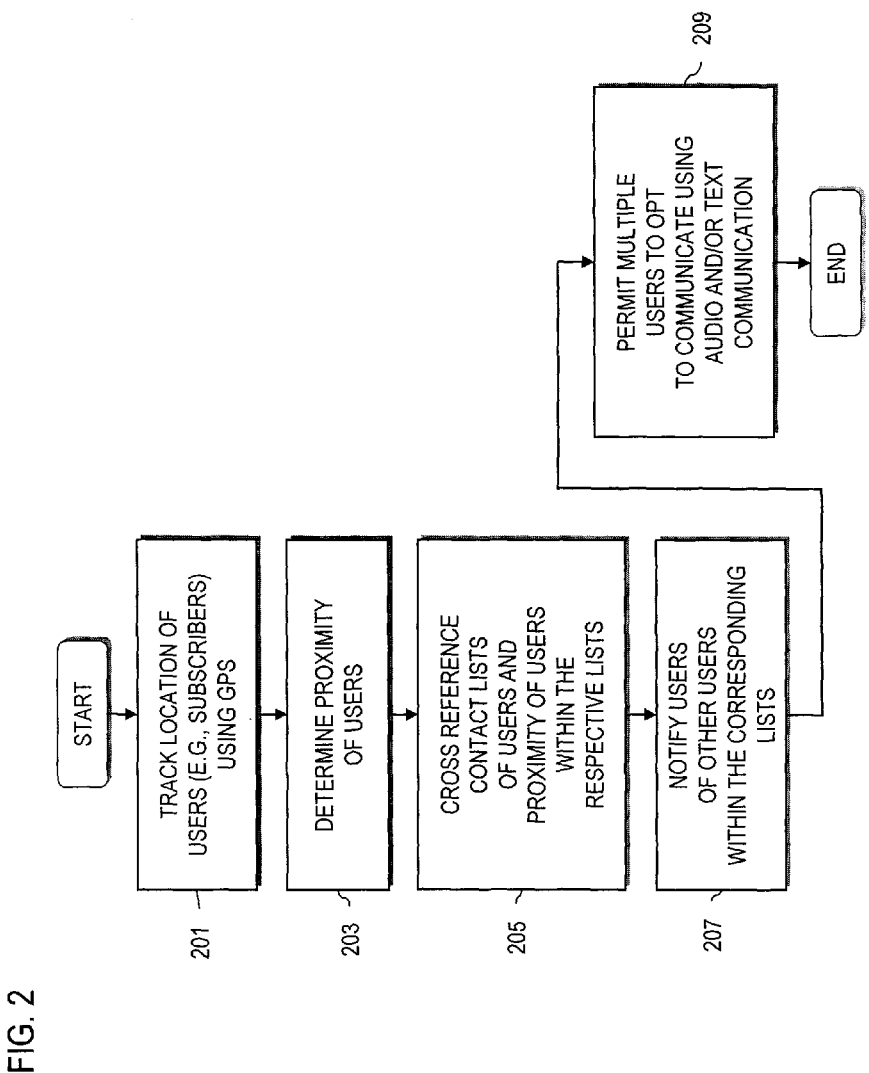
FIG. 2 is a flowchart of a process for providing instant location service, according to an exemplary embodiment.

FIG. 2 is a flowchart of a process for providing instant location service, according to an exemplary embodiment. In step 201, the instant location system 101 tracks location of users (e.g., subscribers) using GPS technology. The proximity of these users is then determined, as in step 203. That is, the system 101 detects the geographical location of the subscribers and locates subscribers within a pre-defined proximity and communicates their current location to other subscribers of the pre-defined same group (as defined by the contact list). This process is more fully described below with respect to FIG. 3. Next, the instant location system 101, via the mapping module 117, examines the contact lists of the users, cross-referencing the contact lists with the proximity of the users within the respective contact lists (step 205). The instant location system 101 then notifies, as in step 207, particular users about other users within the corresponding contact lists. For example, a particular user would be aware of the presence and physical location of users within the particular user's contact list. Subsequently, the particular user can opt to communicate with those users who are within the specified proximity of the particular user; a variety of communication methods—e.g., audio and/or text communication—can be utilized (step 209).

Figure 3:
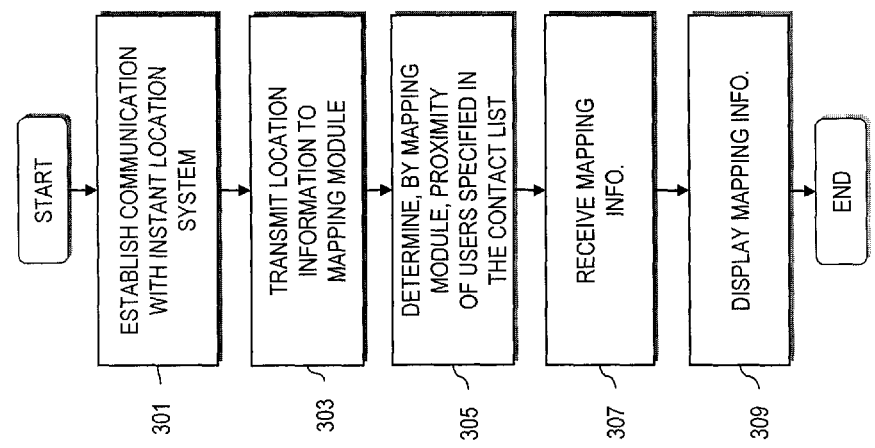
FIG. 3 is a flowchart of a process for obtaining mapping information for presentation at a wireless device, according to an exemplary embodiment.

FIG. 3 is a flowchart of a process for obtaining mapping information for presentation at a wireless device, according to an exemplary embodiment. Location of the wireless devices 103a-103n is obtained from the devices 103a-103n themselves, which establish communication with the instant location system 101 (step 301). Location information, such as GPS data, is acquired through the location module 105, and transmitted to the mapping module 117. It is noted that the location information can be the raw GPS data or data that have been messaged or otherwise derived from the raw data, per step 303. In step 305, the mapping module 117 determines whether the users within the contact list are within the specified proximity, and outputs mapping information for displaying these users onto a map. In step 307, the wireless device 103a, for example, receives the mapping information over the wireless network 109, and presents the map of the users to the particular subscriber (step 309).

Figure 4:
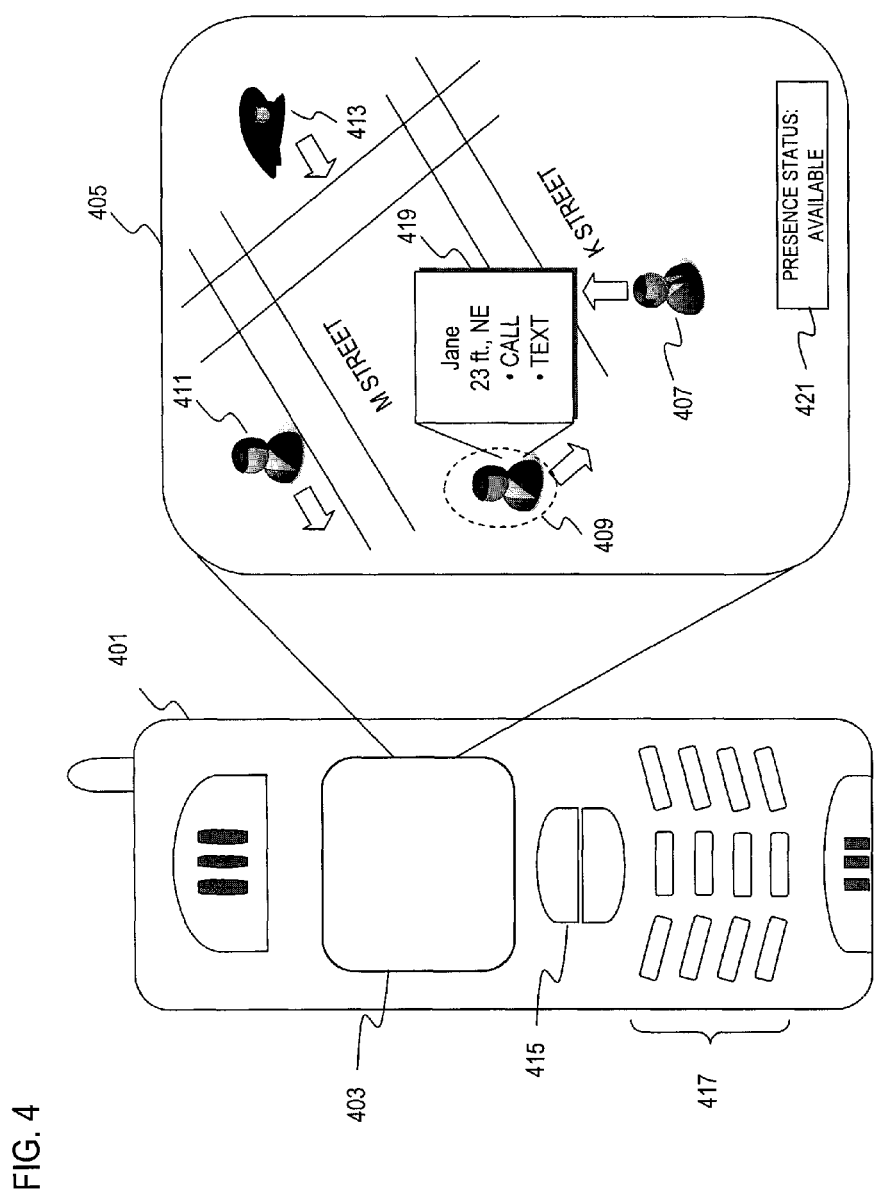
FIG. 4 is a diagram of a wireless device capable of displaying location of users, according to an exemplary embodiment.

FIG. 4 is a diagram of a wireless device capable of displaying location of subscribers, according to an exemplary embodiment. Under this scenario, a mobile device 401 includes a display 403 that is configured to present a graphical map of the location of the particular user 407 in relation to those users 409-413 who are on the contact list and determined to be within the pre-defined proximity. In one embodiment, the user of the mobile device 401 can select, via cursor buttons 415 or key pad 417, one of the other users on the map 405 to obtain additional information. The navigation from one user to the next can be indicated by a highlight, shown a dashed oval around the icon 409. Moreover, an optional capability can illustrate the direction of travel of the users through the use of arrows. In one embodiment, the user of the mobile device 401 is shown as traveling in the north direction.

Upon selection of the icon 409, the mobile device 401 can provide a pop-up menu 419 for information about the user associated with the icon 409. In this example, the user information includes an identifier (e.g., user name or alias), distance to the user, etc. Such user information can be specified as part of the user profile 123; that is, the information that is shared to the user of the mobile device 401 can be controlled by the user whose information is "published" to other users.

As seen in FIG. 4, the users 407-413 can be represented with a variety of symbolic icons, as to convey information about the users 407-413. For instance, if the user (e.g., user 413) is a police officer, an appropriate icon can be used. In this manner, the presence of police and traffic officers as well as other public service workers can be readily determined; and such users can be contacted for immediate emergency assistance.

In various exemplary embodiments, the instant location service can be used to assist users with special needs, especially those users with mobility limitations, e.g., those requiring a wheelchair or visually impaired. Such users can benefit from learning about the proximity of other users with similar disabilities; friends and acquaintances; or authority figures. Of course, for blind users, the proximity and location information can be conveyed aurally, rather then visually. The availability of this information and the access to these individuals (via a phone call or a text chat) can enhance the easiness and safety of their travel experience. In one embodiment, textual content from the devices 103a-103n can now be "read" aloud using a text-to-speech processor (not shown).

In addition, the pop-menu 419 can provide communication options for contacting the selected user 409. Under this scenario, the user can initiate a phone call or text messaging (e.g., IM or SMS). In an exemplary embodiment, a text box 421 indicates presence status information about the selected user 409.

Figure 5:
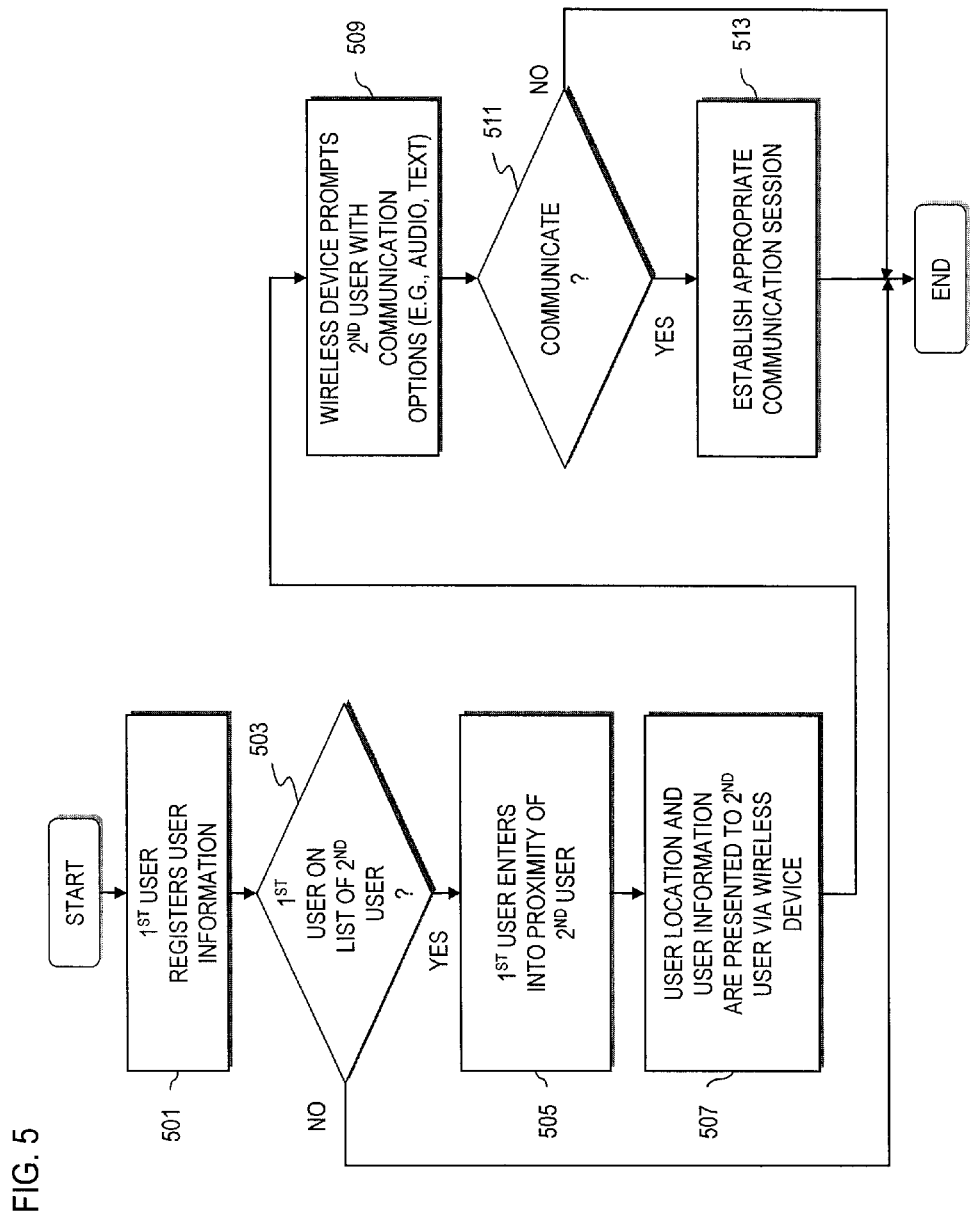
FIG. 5 is a flowchart of a process for communicating with a user who has entered a prescribed proximity, according to an exemplary embodiment.

FIG. 5 is a flowchart of a process for communicating with a subscriber who has entered a prescribed proximity, according to an exemplary embodiment. This process is explained under the exemplary instant location system 100 of FIG. 1. A first user (e.g., using wireless device 103a) registers user information with the instant location system 101, per step 501. The system 101 next determines, as in step 503, whether the first user is on the contact list of a second user (e.g., utilizing wireless device 103n). In step 505, the first user enters the proximity or specified zone of the second user, the system 101 provides the wireless device 103n of the second user with the location of the first user, along with user information, such as an identifier or other attributes (e.g., disabled, etc.), per step 507.

In step 509, the wireless device 103n prompts the second user with an option to commmunicate with the first user. If the second user elects to communicate with the first user, as determined in step 511, an appropriate communication session is established (step 513).

As described, a user's contact list can be controlled by the subscriber through the wireless device 103a itself or through a computing device that is separate from the communication device—e.g., computing device 125.

Figure 6:
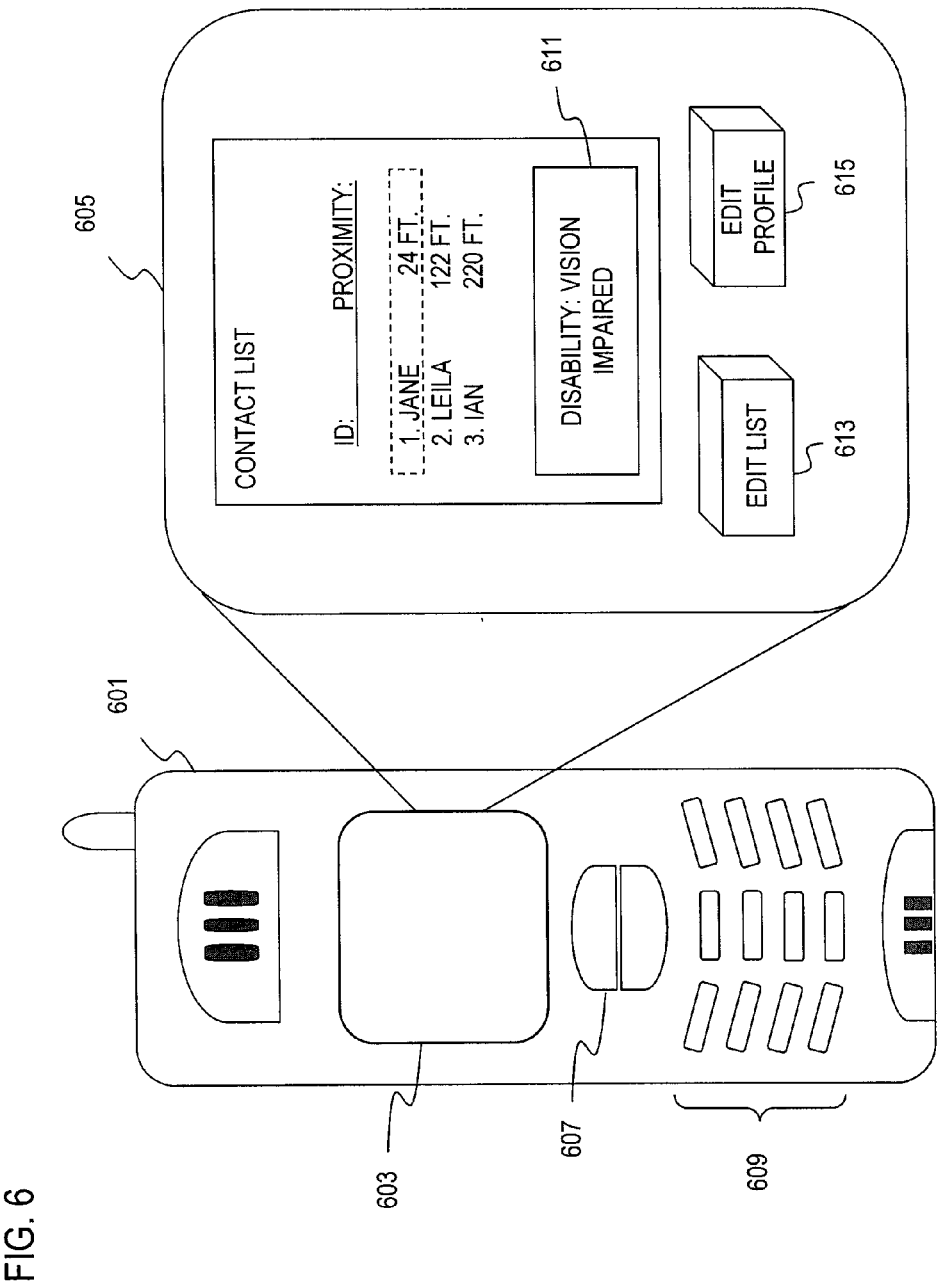
FIG. 6 is a diagram of a wireless device capable of configuring a contact list in support of the location service, according to an exemplary embodiment.

FIG. 6 is a diagram of a wireless device capable of configuring a contact list in support of the location service, according to an exemplary embodiment. In this example, the user can use wireless device 601 to configure and modify the contact list. The device 601 includes a display 603 for providing a graphical user interface (GUI) 605 for modification of the contact list, as well as cursor buttons 607 and a key pad 609.

The GUI 605 presents a contact list that provides, in an exemplary embodiment, an identifier (ID) field for providing the identifiers of members of the user's contact list and a proximity field for specifying the distance to the corresponding members.

By way of example, the user can highlight (or otherwise select) the particular user to reveal user information within a text box 611. In this case, the user has highlighted, using either the cursor keys 607 or key pad 609. The GUI 605 also provides for editing of the contact list through an Edit List button 613. Additionally, the GUI 65 includes an Edit Profile button 615, which permits the user to alter the user profile (or user preferences with respect to the instant location service).

The above administrative function can also be executed using the computing device 125, as next explained.

Figure 7:
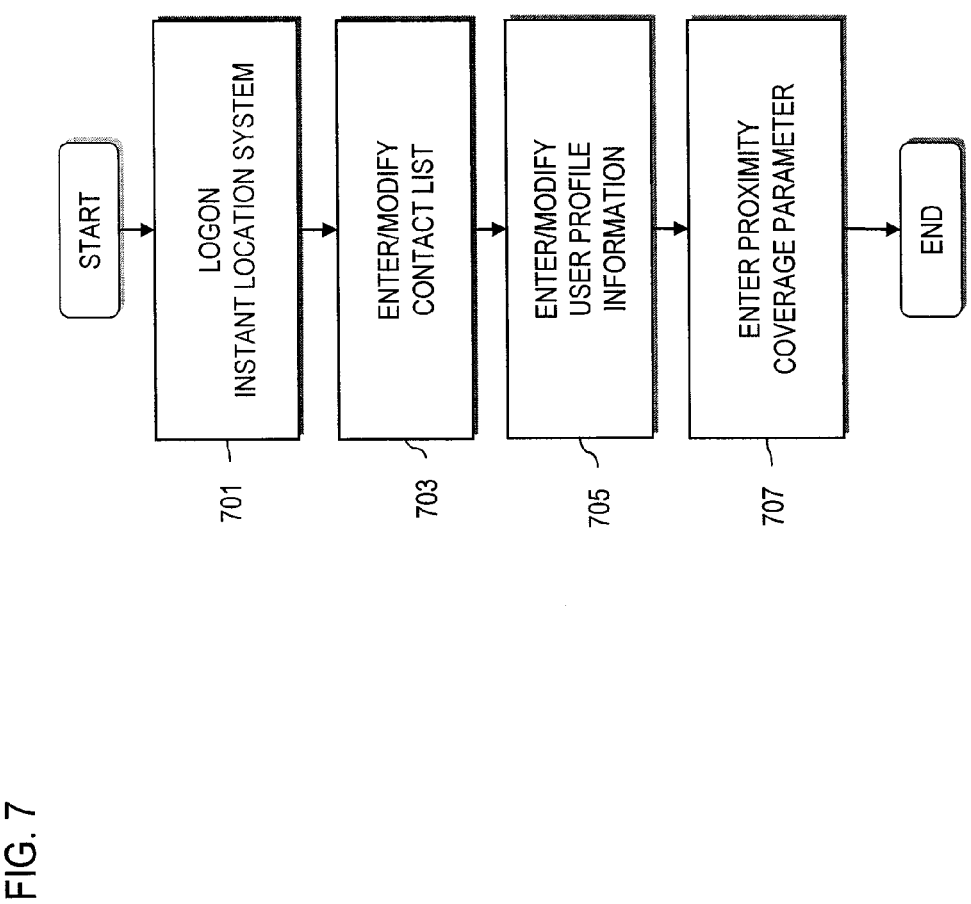
FIG. 7 is a flowchart of a process for communicating with the instant location system of FIG. 1 to update user profile and contact list, according to an exemplary embodiment.

FIG. 7 is a flowchart of a process for communicating with the instant location system of FIG. 1 to update user profile and contact list, according to an exemplary embodiment. A user logs on the instant location system 101 through the computing device 125 over the data network 119, per step 701. The system 101 can present the user with an option to enter/modify the contact list (step 703). Additionally, the user can enter/modify user profile information (step 705), as well as enter parameters associated with the instant location service—e.g., proximity coverage parameter (step 707).

The instant location system 101, as described in FIGS. 1-7, allow subscribers to provide specific information about themselves in order to learn the proximity of other subscribers. Also, the system 101 provides a capability to permit subscribers to communicate via a wireless device with other subscribers within a pre-defined contact list and proximity.

The above described processes relating to providing instant location service using an integrated set-top may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
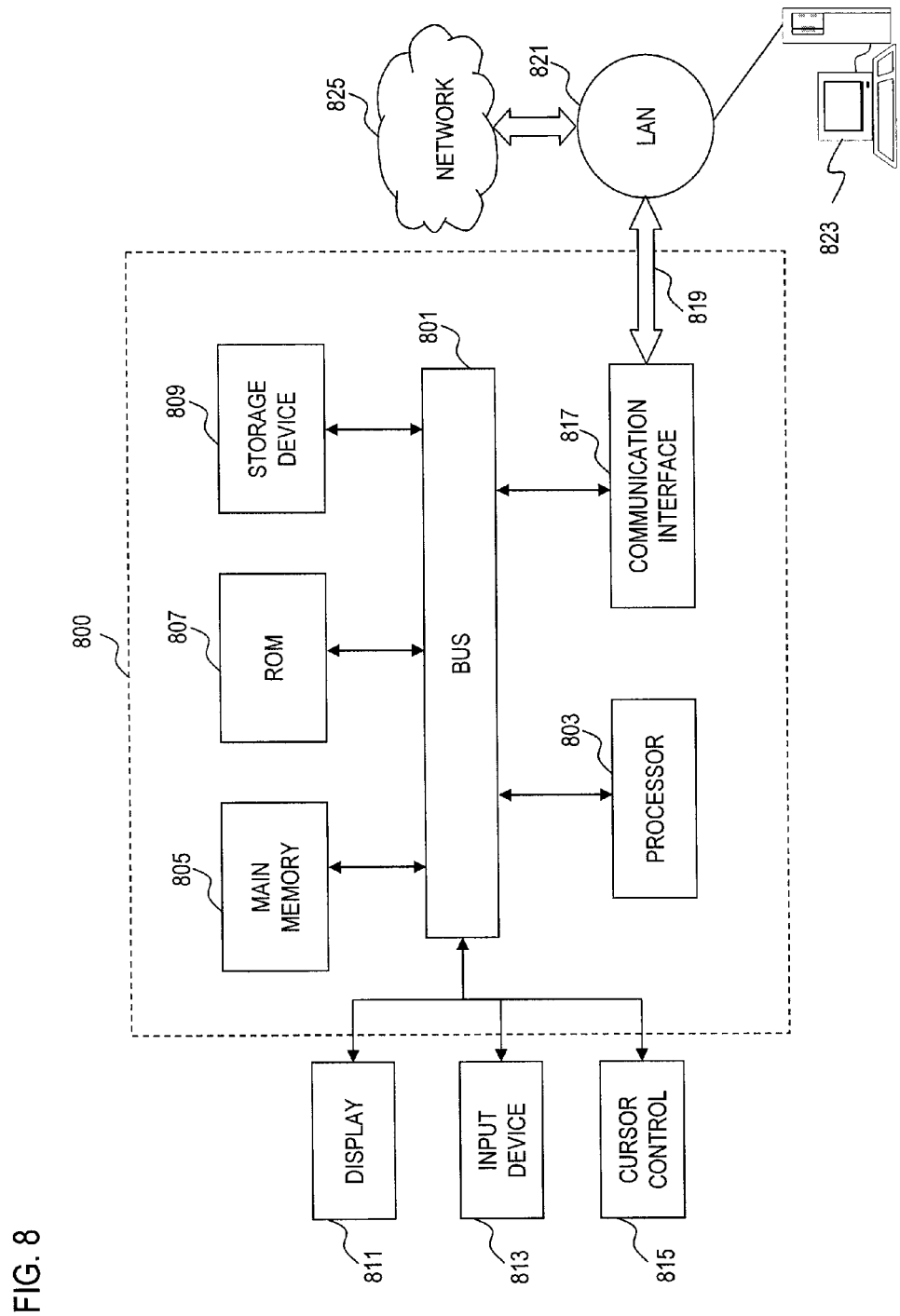
FIG. 8 is a diagram of a computer system that can be used to implement various exemplary embodiments.

FIG. 8 illustrates a computer system 800 upon which an exemplary embodiment can be implemented. For example, the processes described herein can be implemented using the computer system 800. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the exemplary embodiment. Thus, exemplary embodiments are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an exemplary embodiment through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the various exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:
   receiving, at a location system, a list of contacts associated with a first user associated with a first wireless device and, for each contact in the list of contacts, an indication of a prescribed proximity to the first user,
   wherein the location system is remote from the first wireless device;
   receiving, at the location system and from the first wireless device, location information associated with a first plurality of global positioning system (GPS) signals from a first plurality of GPS satellites associated with the first wireless device;
   receiving, at the location system, mapping information associated with a second plurality of GPS signals from a second plurality of GPS satellites associated with a second wireless device of a second user,
   wherein the second user is included in the list of contacts,
   wherein the mapping information indicates that the second user is within the prescribed proximity to the first user, and
   wherein the mapping information specifies a location of the second user within the prescribed proximity to the first user;
   notifying, by the location system, the first user of the location of the second user within the prescribed proximity by sending, to the first user, a map generated by the location system,
   wherein the map depicts the location of the second user within the prescribed proximity to the first user based on the received mapping information,
   wherein the first user and the second user are represented as respective user graphical icons on the map,
   wherein the user graphical icons represent different types of public service workers when a user associated with the user graphical icon is a public servicer worker,
   wherein respective directional graphical icons proximate to the respective user graphical icons indicate first user direction of a first user graphical icon and second user direction of a second user graphical icon,
   wherein, when the second user graphical icon is selected on the map, a pop-up text menu is presented, wherein the pop-up text menu displays:
an identifier associated with the second user,
relative direction and distance of the second user from the first user, and
a plurality of options for initiating a communication session with the second user, and
wherein information associated with the second user is displayed in a text box in conjunction with the map when the second user is selected on the map;
presenting a graphical user interface (GUI) to the first user for modifying contact information associated with the second user; and
notifying the first user of a location of a third user within the prescribed proximity to the first user based on the received mapping information,
wherein the third user is represented as another graphical icon on the map, and
wherein an option to initiate another communication session with the third user is presented in conjunction with the map.

2. A method according to claim 1, wherein the map is displayed on the first wireless device,
wherein at least one of the first and second pluralities of GPS satellites includes at least four satellites, and
wherein at least one of the first or second wireless devices determines three-dimensional geolocation based on signals received from the respective first and second pluralities of GPS satellites.

3. A method according to claim 2,
wherein at least one of the first and second pluralities of GPS satellites includes six to eleven satellites.

4. A method according to claim 1, wherein the plurality of options for initiating the communication session includes an option for initiating an audio communication session and an option for initiating text messaging for two-way communication.

5. A method according to claim 1, further comprising:
transmitting the location information to a mapping module within the location system configured to generate the mapping information in response to receiving the location information.

6. A method according to claim 5, wherein the mapping module cross-references the list of contacts within the prescribed proximity to the first user, depicting the location of the second user on the map only when the second user is a member of the list of contacts and is within the prescribed proximity.

7. A method according to claim 1, wherein the first wireless device includes a cellular phone.

8. A method according to claim 1, wherein the respective first and second user graphical icons are symbolic icons that convey information about the respective first user and second user.

9. The method of claim 1, further comprising indicating presence status information of the second user in the text box.

10. A wireless device operated by a first user, the wireless device comprising:
a processor configured to:
send, to a location system, a list of contacts associated with the first user and, for each contact in the list of contacts, an indication of a prescribed proximity to the first user,
wherein the location system is remote from the wireless device,
determine a location of the wireless device based on receiving a first plurality of global positioning system (GPS) signals from a first plurality of GPS satellites, and
send, based on receiving the first plurality of GPS signals, a location of the wireless device to the location system,
wherein the location system further receives mapping information associated with a second plurality of global positioning system GPS signals from a second plurality of GPS satellites associated with a second wireless device of a second user,
wherein the location system is remote from the second wireless device,
wherein the mapping information indicates that the second user is within the prescribed proximity to the first user, and
wherein the mapping information specifies a location of the second user within the prescribed proximity to the first user,
a display configured to:
present the location of the second user when the second user is within the prescribed proximity by displaying a map generated by the location system,
wherein the map depicts the locations of the second user and the first user by representing the first user and the second user on the map as respective user graphical icons,
wherein the user graphical icons represent different types of public service workers when a user associated with the user graphical icon is a public servicer worker,
wherein respective directional graphical icons on the map proximate to the respective user graphical icons indicate first user direction of a first user graphical icon and second user direction of a second user graphical icon within the prescribed proximity on the map,
wherein, when the second user graphical icon is selected on the map, a pop-up text menu is presented on the map, and
wherein the pop-up text menu displays:
an identifier associated with the second user,
a relative direction and distance of the second user from the first user, and
a plurality of options for initiating a communication session with the second user;
notify the first user of a location of a third user when the third user is within the prescribed proximity to the first user;
provide an option to initiate, by the wireless device, a communication session over a wireless network with the third user; and
represent the third user on the map as another graphical icon,
wherein a communication session is initiated over the wireless network to the third user,
wherein the second user and the third user are contacts in the list of contacts, and the display is further configured to present a graphical user interface (GUI) for modifying the list of contacts, and
wherein the GUI is configured to permit the first user to selectively highlight the name of the second user on the list of contacts to reveal profile information about the second user in a text box.

11. An apparatus according to claim 10, wherein the second user is represented by the second user graphical icon, wherein at least one of the first or second pluralities of GPS satellites includes at least four satellites, and wherein at least one of the wireless device or the second wireless device determines three-dimensional geolocation based on signals received from the respective first and second pluralities of GPS satellites.

12. An apparatus according to claim 10, wherein the plurality of options for initiating the communication session includes an option for initiating an audio communication session and an option for initiating text messaging for two-way communication, and wherein at least one of the first or second pluralities of GPS satellites includes six to eleven satellites.

13. An apparatus according to claim 10, further comprising:

a GPS module coupled to the processor and configured to determine position information of the wireless device, wherein the position information is transmitted to a mapping module of the location system configured to generate the mapping information in response to the position information.

14. An apparatus according to claim 10, wherein the display is further configured to present the location of a fourth user based on the received mapping information, and an additional communication session is initiated over the wireless network to the fourth user.

15. An apparatus according to claim 10, wherein the respective first and second user graphical icons are symbolic icons that convey information about the respective first user and second user.

16. The wireless device of claim 10, wherein presence status information of the second user is presented in the text box.

17. A method comprising:

receiving, from a first user associated with a first wireless device and at a location system, a list of contacts associated with the first user and, for each contact in the list of contacts, an indication of a prescribed proximity to the first wireless device, wherein the location system is remote from the first wireless device;

receiving first location information from the first wireless device, over a wireless network, wherein the first location information is associated with a first plurality of global positioning system (GPS) signals from a first plurality of GPS satellites;

receiving second location information from a second wireless device associated with a second user within the prescribed proximity to the first wireless device over the wireless network, wherein the second location information is associated with a second plurality of GPS signals from a second plurality of GPS satellites, wherein the second wireless device is remote from the location system;

generating, by the location system, mapping information for the first wireless device, wherein the mapping information specifies a location of the second wireless device when the second wireless device is within the prescribed proximity of the first wireless device;

transmitting the mapping information to the first wireless device over the wireless network, wherein the mapping information causes a map, generated by the location system, to be displayed on the first wireless device, wherein the map depicts the location of the second wireless device when the second wireless device is within the prescribed proximity to the first wireless device, wherein the second user is a member of the list of contacts, wherein the first user and the second user are represented on the displayed map as respective user graphical icons, wherein respective directional graphical icons proximate to the respective user graphical icons indicate first user direction of a first user graphical icon and second user direction of a second user graphical icon on the map, wherein, when the second user graphical icon is selected on the map, a pop-up text menu is provided on the map, and wherein the pop-up text menu displays:
an identifier associated with the second user,
a relative direction and distance of the second user from the first user, and
a plurality of options to initiate a communication session with the second user;

notifying the first user of a location of a third user when the third user is within the prescribed proximity to the first user, wherein the third user is represented on the map as another graphical icon, and wherein an option to initiate another communication session with the third user is presented in connection with the map; and presenting a graphical user interface (GUI) to the first user for modifying the list of contacts, wherein profile information about the second user is presented in a text box when a name of the second user is highlighted in the list of contacts.

18. A method according to claim 17, wherein the second wireless device is represented by the second user graphical icon, wherein at least one of the first or second pluralities of GPS satellites includes at least four satellites; and wherein at least one of the first or second wireless devices determines three-dimensional geolocation based on signals received from the respective first and second pluralities of GPS satellites.

19. A method according to claim 17, wherein the plurality of options for initiating the communication session includes an option for initiating an audio communication session and an option for initiating text messaging for two-way communication, and wherein at least one of the first or second pluralities of GPS satellites includes six to eleven satellites.

20. A method according to claim 17, wherein each of the first wireless device and the second wireless device determines position information based on a plurality of GPS signals.

21. A method according to claim 17, wherein the respective first and second user graphical icons are symbolic icons that convey information about the respective first user and second user.

22. A method according to claim 17, further comprising representing a direction of travel of at least one of the first user or the second user.

23. The method of claim 17, further comprising indicating presence status information of the second user in the text box.

24. A system comprising:
a mapping module configured to:
  receive, from a first user associated with a first wireless device, a list of contacts and, for each contact in the list of contacts, an indication of a prescribed proximity to the first user, wherein the list of contacts includes a second user associated with a second wireless device;
  receive first location information from the first wireless device over a wireless network, and second location information from the second wireless device over the wireless network,
  wherein the system is remote from the first wireless device and the second wireless device,
  wherein the first location information is associated with a first plurality of global positioning system (GPS) signals from a first plurality of GPS satellites, and
  wherein the second location information is associated with a second plurality of GPS signals from a second plurality of GPS satellites;
  determine, based on the first location information and the second location information, that the second wireless device is within the prescribed proximity to the first wireless device;
  generate mapping information for the first wireless device, the mapping information specifying a location of the second wireless device when the second wireless device is within the prescribed proximity of the first wireless device,
  wherein the mapping information is transmitted to the first wireless device,
  wherein the mapping information includes a map depicting the location of the first wireless device and the second wireless device when the second wireless device is within the prescribed proximity to the first wireless device,
  wherein the first user and the second user are represented on the map as respective user graphical icons,
  wherein the user graphical icons represent different types of public service workers when a user associated with the user graphical icon is a public servicer worker,
  wherein respective directional graphical icons proximate to the respective user graphical icons indicate first user direction of a first user graphical icon and second user direction of a second user graphical icon on the map,
  wherein, when the second user graphical icon is selected on the map, a pop-up text menu is presented on the map, and
  wherein the pop-up text menu displays:
    an identifier associated with the second user,
    a relative direction and distance of the second wireless device from the first wireless device, and
    a plurality of options to initiate a communication session with the second wireless device;
  notify the first user of a location of a third user when the third user is within the prescribed proximity to the first user,
  wherein the third user is represented on the map as another graphical icon; and
  present a graphical user interface (GUI) to the first user for modifying the list of contacts,
    wherein profile information about the second user is presented in a text box when a name of the second user is highlighted in the list of contacts.

25. A system according to claim 24, wherein the second wireless device is represented by the second user graphical icon,
  wherein at least one of the first and second pluralities of GPS satellites includes at least four satellites, and
  wherein at least one of the first and second wireless devices determines three-dimensional geolocation based on signals received from the respective first and second pluralities of GPS satellites.

26. A system according to claim 24, wherein the plurality of options to initiate the communication session includes an option to initiate an audio communication session and an option to initiate text messaging for two-way communication,
  wherein at least one of the first or second pluralities of GPS satellites includes six to eleven satellites.

27. A system according to claim 24, wherein the first wireless device and the second wireless device are each configured to determine position information based on a plurality of global positioning system (GPS) signals.

28. A system according to claim 24, wherein the respective first and second user graphical icons are symbolic icons that convey information about the respective first user and second user.

* * * * *